| (12) | United States Patent | (10) Patent No.: | US 9,183,225 B2 |
|---|---|---|---|
| | Zombo | (45) Date of Patent: | Nov. 10, 2015 |

(54) COMPUTERIZED METHOD FOR TRANSFORMING AN IMAGE FROM AN IMAGE-SEARCHABLE DOMAIN TO A PIXEL-SEARCHABLE DOMAIN

(71) Applicant: Siemens Energy, Inc., Orlando, FL (US)

(72) Inventor: Paul J. Zombo, Cocoa, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 91 days.

(21) Appl. No.: 14/186,267

(22) Filed: Feb. 21, 2014

(65) Prior Publication Data

US 2015/0242440 A1 Aug. 27, 2015

(51) Int. Cl.
*G06K 9/54* (2006.01)
*G06F 17/30* (2006.01)
*G06T 3/00* (2006.01)

(52) U.S. Cl.
CPC ...... *G06F 17/30247* (2013.01); *G06F 17/3028* (2013.01); *G06T 3/0056* (2013.01)

(58) Field of Classification Search
CPC . G06K 9/00; G06K 9/00201; G06K 9/00208; G06K 9/00248; G06K 9/00261; G06K 9/00288; G06K 9/00362; G06K 9/00369; G06K 9/00577; G06K 9/0063; G06K 9/0071; G06K 9/00744; G06K 9/2054; G06K 9/32; G06K 9/3241; G06K 9/4604; G06K 9/4642; G06K 9/4647; G06K 9/4652; G06K 9/4671; G06K 9/6206; G06K 9/6217; G06K 9/6255; G06K 9/6857; G06K 19/06; G06K 19/06009; G06K 2009/4666; G06K 2209/19; G06K 9/80; G06T 3/0056; G06T 7/0006; G06T 7/001; G06T 7/0012; G06T 7/0022; G06T 7/0042; G06T 7/0046; G06T 7/0075; G06T 7/2006; G06T 15/08; G06T 17/007; G06T 17/05; G06T 19/00; G06T 2200/24; G06T 2207/10012; G06T 2207/10021; G06T 2207/10132; G06T 2207/20016; G06T 2219/028; G06T 1/00; H04N 1/32128; H04N 1/32203; H04N 19/48; H04N 19/533; H04N 19/57; H04N 19/63; H04N 2013/0081; H04N 2013/0092; H04N 2201/3225; H04N 2201/325; H04N 2201/3274; H04N 1/00307; H04N 7/163; H04N 19/46; H04N 19/60; H04N 21/4223; H04N 21/4355; H04N 21/84; H04N 21/85406; G06F 3/011; G06F 3/04815; G06F 17/30; G06F 17/30241; G06F 17/30244; G06F 17/30247; G06F 17/30259; G06F 17/30268; G06F 17/30333; G06F 17/30395; G06F 17/30477; G06F 17/3053; G06F 17/30536; G06F 17/30539; G06F 17/30755; G06F 17/30864; G06F 17/3087; G06F 17/30716; Y10S 707/968; Y10S 707/99933; Y10S 707/99934; Y10S 707/99935; Y10S 707/99936; Y10S 707/99931; Y10S 707/99942

See application file for complete search history.

(56) References Cited

U.S. PATENT DOCUMENTS 5,734,893 A * 3/1998 Li et al. .................... 707/694
6,463,426 B1 10/2002 Lipson et al.

(Continued)

FOREIGN PATENT DOCUMENTS

| EP | 1134699 A2 | 9/2001 |
|---|---|---|
| EP | 1887513 A2 | 2/2008 |

OTHER PUBLICATIONS

Weyand, T. "Combining content-based image retrieval with textual information retrieval", Research project by Tobias Weyand supervised by Thomas Deselaers at the Chair of Computer Science 6, RWTH Aachen Oct. 2005.*

(Continued)

*Primary Examiner* — Jose Couso

(57) ABSTRACT

Computerized methodology for organizing and/or retrieving pixel data for rendering digital images In one embodiment, the method may include transforming (12) an image depicting an object from an image-searchable domain to a pixel-searchable domain by way of spatial and temporal registration assigned to pixels forming the image The method may further include storing (14) pixel data including the spatial and temporal registration in an electronic storage Pixel data may be retrieved (16) from the electronic storage based on the assigned spatial and temporal registration An image may be reconstituted (18) with the retrieved pixel data This methodology may be used in a broad array of technical fields, such as for inspections of components of a turbine engine, medical imaging applications, ecological and biodiversity applications, etc.

16 Claims, 3 Drawing Sheets

(56) References Cited

U.S. PATENT DOCUMENTS

| | | | |
|---|---|---|---|
| 7,114,660 | B1 | 10/2006 | Cok et al. |
| 7,317,456 | B1 | 1/2008 | Lee |
| 7,690,840 | B2 | 4/2010 | Zombo et al. |
| 8,027,547 | B2 | 9/2011 | Hua et al. |
| 8,176,053 | B2 | 5/2012 | Salemann |
| 8,190,585 | B2 | 5/2012 | Salemann |
| 8,244,025 | B2 | 8/2012 | Davis et al. |
| 8,392,354 | B2 | 3/2013 | Salemann |
| 8,458,188 | B2 | 6/2013 | Salemann |
| 8,458,225 | B2 | 6/2013 | Salemann |
| 8,477,154 | B2 | 7/2013 | Davis et al. |
| 8,504,547 | B1 | 8/2013 | Yee et al. |
| 8,525,834 | B2 | 9/2013 | Salemann |
| 8,527,476 | B2 | 9/2013 | Salemann |
| 8,527,519 | B2 | 9/2013 | Salemann |
| 8,542,951 | B2 | 9/2013 | Ohashi |
| 8,577,151 | B2 * | 11/2013 | Hu ................................ 382/195 |
| 8,620,772 | B2 * | 12/2013 | Owen ........................... 705/26.9 |
| 2005/0065916 | A1 | 3/2005 | Ge et al. |
| 2011/0202326 | A1 | 8/2011 | Salemann |
| 2012/0299911 | A1 * | 11/2012 | Tytgat et al. ................. 345/419 |
| 2013/0060121 | A1 | 3/2013 | Patwardhan et al. |

OTHER PUBLICATIONS

Aitor Ibarguren et al., "Thermal Tracking in Mobile Robots for Leak Inspection Activities", Oct. 9, 2013. Sensors 2013, 13, 13560-13574; doi:10.3390/s131013560, © 2013.

Sindre Skjønsberg, "Ranking Mechanisms for Image Retrieval based on Coordinates, Perspective, and Area", Norwegian University of Science and Technology, Jun. 2010, 80 pages.

Hernan Dario Benitez R. et al., "System for retrieval of defective electrical equipment infrared images using CBIR (Content Based Image Retrieval)", 2008, Department of Science and Engineering of Computing Pontificia Universidad Javeriana Cali, Colombia.

Achimugu Philip et al., "Development of an Image Retrieval Model for Biomedical Image Databases", Efficient Decision Support Systems—Practice and Challenges in Biomedical Related Domain, book edited by Chiang Jao, Publisher: InTech, Sep. 6, 2011, Chapter 17.

Oren Boiman et al., "Detecting Irregularities in Images and in Video", Department of Computer Science and Applied Math, The Weizmann Institute of Science, Rehovat, Israel.

Mauro Hiromu Tatibana et al, "Novel Automatic PCB Inspection Technique Based on Connectivity", IEEE, X Brazilian Symposium on Computer Graphics and Image Processing, Oct. 1997, Campos do Jordao, Brazil.

* cited by examiner

COMPUTERIZED METHOD FOR TRANSFORMING AN IMAGE FROM AN IMAGE-SEARCHABLE DOMAIN TO A PIXEL-SEARCHABLE DOMAIN

FIELD OF THE INVENTION

The present invention is generally related to computerized techniques for organizing and/or retrieving pixel data for rendering digital images, and, more particularly, to computerized techniques that allow transforming an image from an image-searchable domain to a pixel-searchable domain.

BACKGROUND OF THE INVENTION

Vision is an important source of information for humans, and the acquisition and utilization of images, such as digital images, has numerous applications in a broad range of endeavors, such as industrial, medical, ecological, scientific, engineering, publishing, educational, and other endeavors For example, in a power generation application there may be a large number of digital images capturing visual examinations and inspections performed throughout the manufacturing and service life of a typical component for a combustion gas turbine engine Within a given business organization, these images may be acquired by different personnel and for meeting different objectives.

To augment traditional manual visual inspections, it is known to utilize the capabilities of modern optical imaging devices with computers and software in systems, often referred to as computer aided visual inspections. See U.S. Pat. Nos. 8,477,154 and 8,244,025 as examples of computer aided inspection of objects based on processing of acquired images of the objects, each commonly assigned to the assignee of the present invention The widespread use of digital images is intensifying the need to develop more effective ways for organizing and/or retrieving such images. Disclosed embodiments are believed to successfully address at least such needs.

BRIEF DESCRIPTION OF THE DRAWINGS

The invention is explained in the following description in view of the drawings that show.

DETAILED DESCRIPTION OF THE INVENTION

Figure 1:
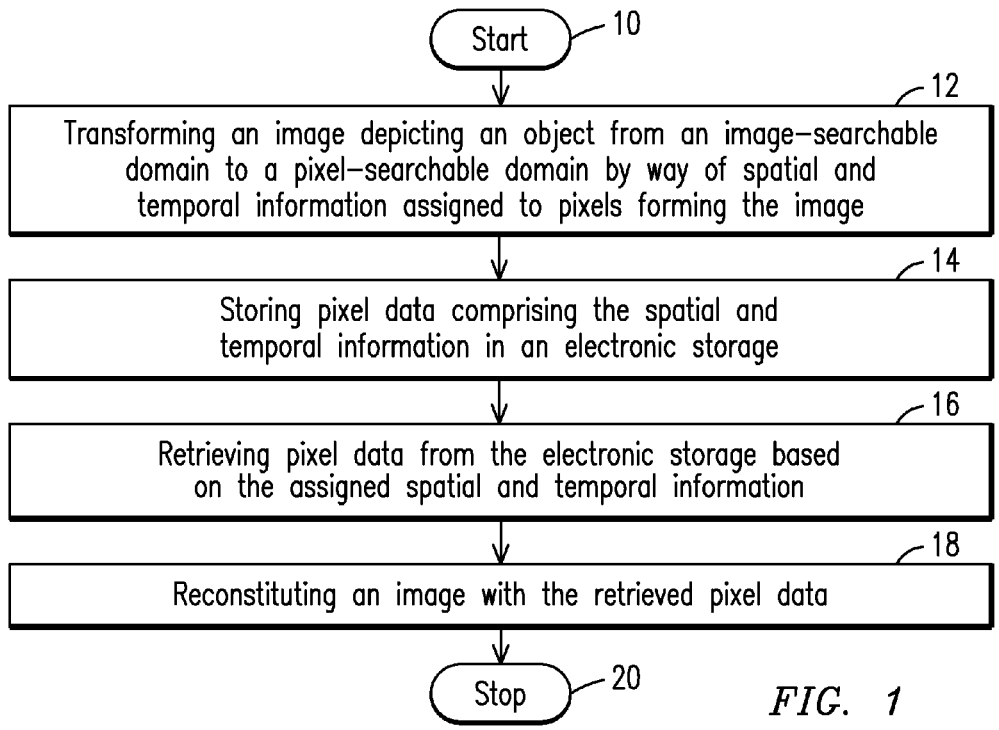
FIG. 1 is a flow chart of a non-limiting embodiment of a method embodying aspects of the present invention, as may be used for transforming an image from an image-searchable domain to a pixel-searchable domain.

The present inventor has innovatively recognized certain limitations in connection with known techniques for organizing and/or retrieving digital images in an image-searchable domain The ready availability of computer storage, such as local hard drives, removable memory storage devices, Internet Web servers, etc, has dramatically increased the quantity of digital images that may be stored by users. However, users can be overwhelmed quickly by a large volume (potentially thousands) of unorganized or poorly organized digital images.

In a typical image-searchable domain, the stored digital images may commonly use respective file identifiers, such as file names, etc., associated with respective images. However, such file identifiers may be haphazardly constructed without the benefit of any systematic protocol for organizing the image files and/or may use non-descriptive file names such as "ImageComponent0001", etc. Accordingly, users may need to review large numbers of digital images in order to locate a desired digital image. This is conceptually analogous to the proverbial challenge of finding a needle in a haystack (i e, finding a given image file among the large number of files in the storage devices) The inability to easily retrieve a desired digital image can be frustrating. Moreover, although large numbers of digital images may have been accumulated at diverse sites of a given business organization, just a small fraction of such digital images may be put to practical use at such diverse sites as a result of the inability to appropriately organize such digital images and the concomitant difficulties in retrieving such digital images At least in view of such recognition, the present inventor proposes a novel methodology that allows transforming an image depicting an object from an image-searchable domain to a pixel-searchable domain by way of spatial and temporal registration assigned to individual pixels forming the image. Under this innovative paradigm, the image files and associated file identifiers are no longer relevant and may be discarded, since in a pixel-searchable domain, each pixel may be assigned respective spatial coordinates and a time stamp that allows retrieval of pixel data of interest, such as may render a desired surface or volume of an object, based on the assigned spatial coordinates and time stamp The pixel data may then be reconstituted to render a desired image to a user, such as an image of a desired surface or volume of an object.

While users may have no understanding of current file naming nomenclature, and thus may be ineffective in finding a desired image based upon a file name search, users nonetheless usually have a knowledge of spatial information for an image of interest, such as wanting an image of a specific component of a specific plant. In an embodiment of the invention, such a user can quickly and efficiently find such a desired image by simply searching a database of pixel data organized by spatial information. Such a search may also include a temporal search constraint, such as finding all images of the component of interest (i.e location of interest) over the past five years Because location and time are identifiers of common understanding to users, the process of finding image data of interest by the described pixel searchable method is much simpler than with prior art file name based (image searchable) methods In the following detailed description, various specific details are set forth in order to provide a thorough understanding of such embodiments However, those skilled in the art will understand that embodiments of the present invention may be practiced without these specific details, that the present invention is not limited to the depicted embodiments, and that the present invention may be practiced in a variety of alternative embodiments In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention However, the order of description should not be construed as to imply that these operations need be performed in the order they are presented, nor that they are even order dependent unless otherwise so described Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated FIG. 1 is a flow chart of one non-limiting embodiment of a computerized method embodying aspects of the present invention, as may be used for transforming an image from an image-searchable domain to a pixel-searchable domain. Subsequent to a start step 10, step 12 allows transforming an image depicting an object from an image-searchable domain (such as file name) to a pixel-searchable domain by way of a unique registration for each pixel, such as spatial and temporal registration assigned to pixels forming the image Step 14 allows storing pixel data comprising the spatial and temporal registration in an electronic storage Step 16 allows retrieving pixel data based on the assigned spatial and temporal pixel registration. Prior to a stop step 20, step 18 allows reconstituting an image with the retrieved pixel data.

Figure 2:
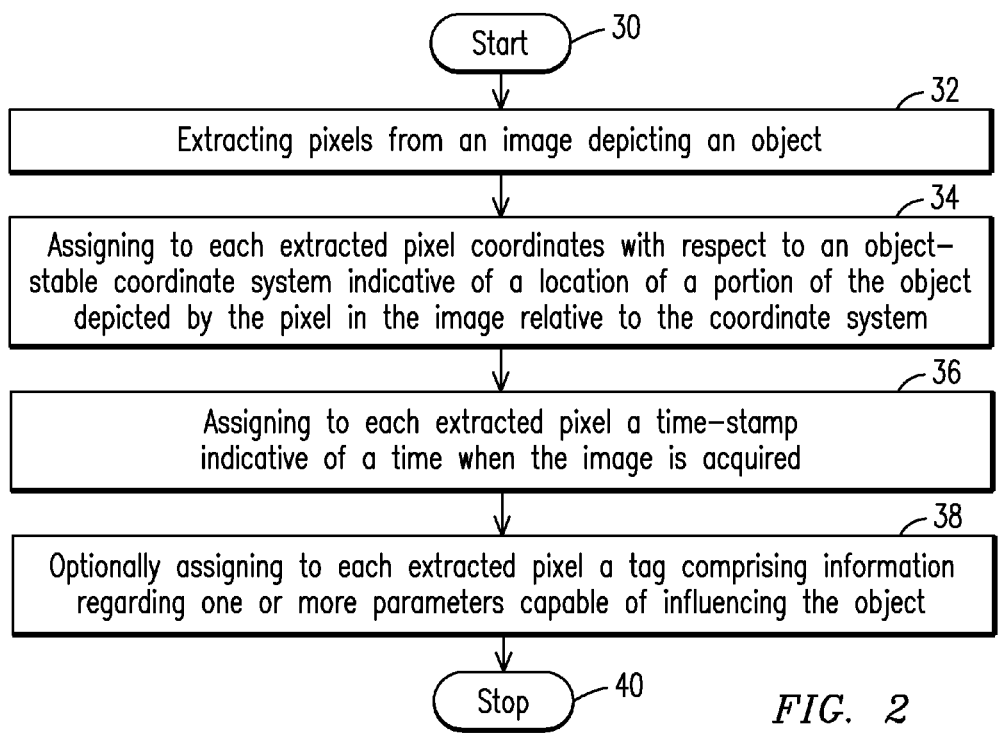
FIG. 2 is a flow chart of a non-limiting embodiment of a method embodying further aspects of the present invention.
Figure 3:
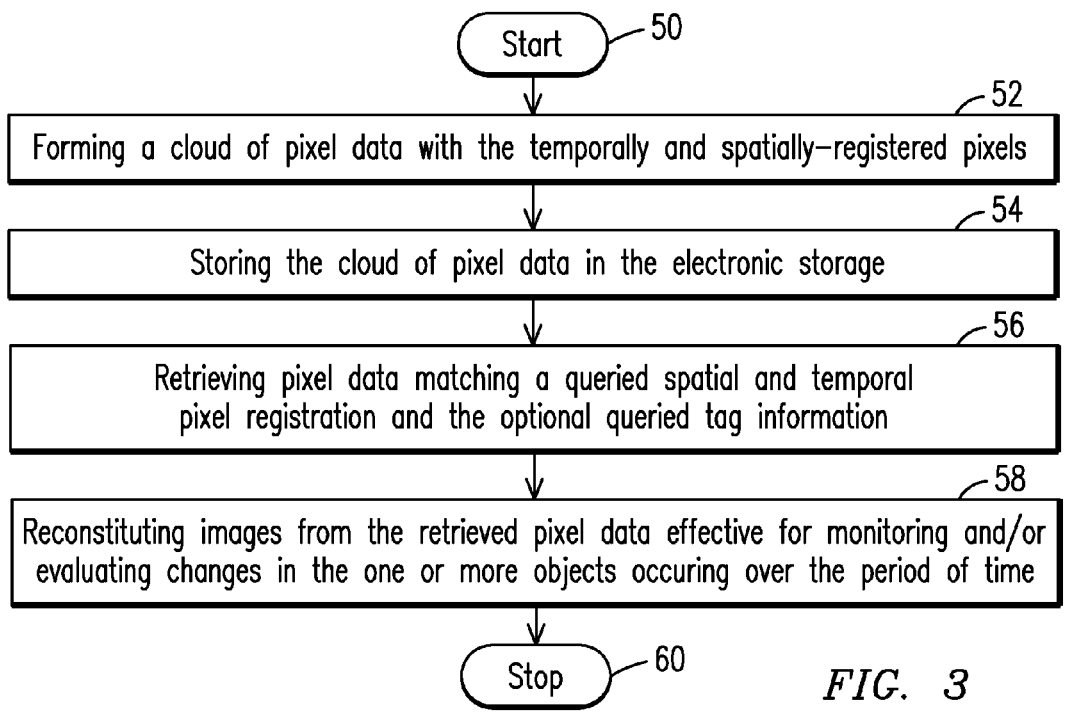
FIG. 3 is a flow chart of a method embodying yet further aspects of the present invention

FIG. 2 is a flow chart of a computerized method embodying further aspects of the present invention In one non-limiting example, the transforming step may comprise the following subsequent to a start step 30, step 32 allows extracting pixels from the image depicting the object. Step 34 allows assigning, to each extracted pixel, coordinates with respect to an object-stable coordinate system indicative of a location of a portion of the object depicted by the pixel in the image relative to the coordinate system Depending on the needs of a given application, the coordinate system may be a two-dimensional coordinate system, or a three-dimensional coordinate system Step 36 allows assigning to each extracted pixel a time-stamp indicative of a time when the image is acquired Prior to a stop step 40, step 38 allows optionally assigning to extracted pixels a tag comprising information regarding one or more parameters capable of influencing the object The foregoing steps may be performed in images acquired over a period of time of one or more objects to generate a plurality of temporally and spatially-registered pixels over the period of time and relatable to respective object-stable coordinate systems for the one or more objects It will be appreciated that the foregoing assignment of spatial, temporal and optional tag information need not be limited to individual pixels since such assignment may be performed on respective groups of pixel components For example, digital color image elements may be formed by a collection of a number of (e g., three or four) pixel component intensities, such as red, green and blue; or cyan, magenta, yellow and black Thus, in this example, each digital color image element, which may be comprised of groups of pixel components, may be assigned the spatial, temporal and optional tag information. It will be further appreciated that the foregoing assignment of spatial, temporal and optional tag information can also be readily extended to voxels (volumetric elements), which may be commonly used for the visualization and analysis of medical and scientific data. For the sake of establishing a common terminology, the term pixel is used herein, however, that term should be interpreted in a broad sense to include other image elements such as, but not limited to, at least voxels and groups of pixels or pixel components FIG. 3 is a flow chart of a computerized method embodying yet further aspects of the present invention Subsequent to a start step 50, step 52 may allow forming a cloud of pixel data with the temporally and spatially-registered pixels Step 54 allows storing the cloud of pixel data in the electronic storage. Step 56 allows retrieving pixel data matching a queried spatial and temporal pixel registration and the optional queried tag information Prior to stop step 60, step 58 allows reconstituting images from the retrieved pixel data effective for monitoring and/or evaluating changes in the one or more objects occurring over the period of time.

In one non-limiting application, the object may be a component of a combustion turbine engine, such as stationary components (e g., vanes) or rotatable components (e g., turbine blades) of the turbine engine These components may be respectively disposed at one or more power generation sites positioned at different geographical locations. In this application, tag information may be indicative of operational conditions, such as a type of fuel being used in a given turbine engine, temperature information, imaging conditions, such as imaging under white light, thermal imaging, etc., and/or may be indicative of characteristics of the components, such as component style, identification of applicable manufacturing badge, etc In this application, the object-stable coordinate system may be referenced to a geodetic coordinate system, such as may be obtained from a global positioning system, etc.

Figure 4:
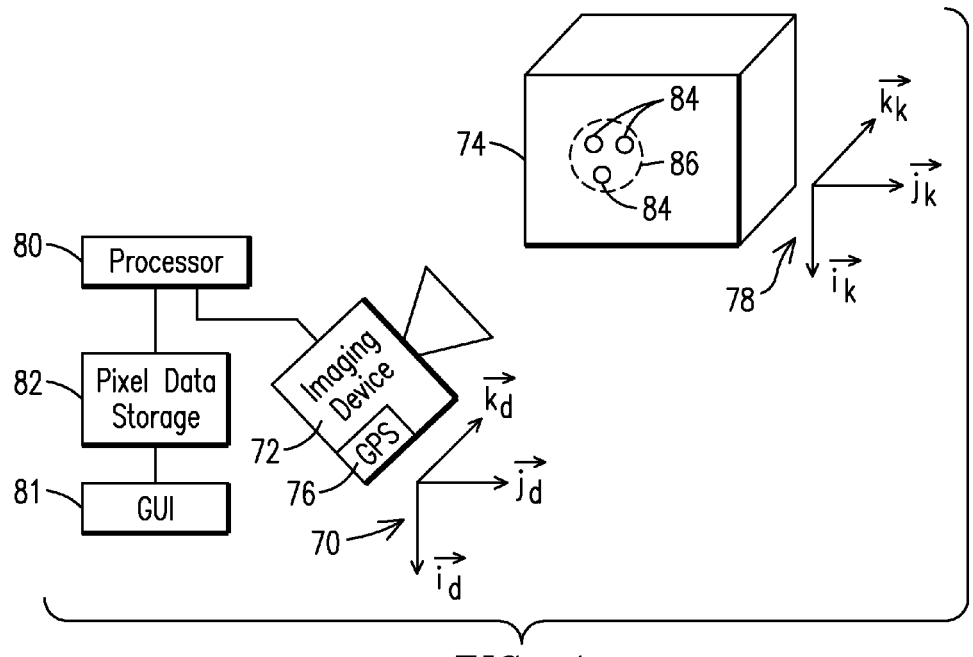
FIGS. 4 and 5 are respective schematics that may be used for conceptualizing example coordinate systems that may be used for assignment of pixel coordinates for forming spatially and temporally registered pixel data in the context of imaging an object, such as a component of a combustion turbine engine

In one non-limiting example, as illustrated in FIG. 4, a coordinate system 70 may be associated with an imaging device 72, such as a camera, arranged to acquire one or more images of an object 74, such as a component of a combustion turbine engine. Imaging device 72 may include a global positioning system (GPS) module 76, or any other means for acquiring positioning data (e g, cellular or broadcast tower signals, Wi-Fi signals, Radio-Frequency Identification (RFID) signals, etc., which may be used as complementary (e.g., a hybrid positioning system), or as alternative options to GPS, as may be used to establish geodetic coordinates (such as may be represented in terms of latitude, longitude and height) in the coordinate system 70 associated with imaging device 72. Pixel coordinates of the object relative to imaging device 72 may be projected onto the imaging plane of the camera using techniques well-understood in the art, such as by way of a model of the optics utilized by imaging device 72; or may be obtained by way of projecting pixel position measurements onto the imaging plane of the camera, such as may obtained with a 3-D laser scanning device or an ultrasound scanning device.

In one non-limiting embodiment, a local coordinate system 78 may be associated with object 74. By way of example, local coordinate system 78 may be obtained from a 3D computer-aided design (CAD) model of the turbine engine that locally maps the coordinates of the various components of the turbine engine relative to one or more local references of the turbine, such as a center line of the turbine engine, or other predefined turbine reference.

It will be appreciated by those skilled in the art that the geodetic coordinates obtained for the coordinate system 70 associated with the imaging device 72 may be related to the local coordinate system 78 of the object by way of vector analysis, as may be performed in a processor 80 Thus, one can go from the geodetic coordinate system 70 to the local coordinate system 78 so that pixels extracted from an image of the component may be spatially and temporally registered at the local level for each geographical site For example, presuming two similar turbine engine installations at two different sites, the geodetic coordinates would identify site location while the local coordinates would allow tracking any desired component relative to the CAD model of the turbine engine. Thus, a user by way of a user interface, such as graphical user interface (GUI) 81, for example, would be able to query pixel data from a storage device 82 for any desired turbine installation site and for any desired component of interest over a desired period of time For example, presuming a user is interested in monitoring or inspecting changes over a desired period of time in features 84 (such as could be indicative of structural changes, etc.,) that may be located within an area (or volume) 86 of component 74, then the user may query pixel data with coordinates encompassing the area (or volume) 86 over the desired period of time. Once such pixel data is retrieved, images of the area (or volume) of interest may be reconstituted by processor 80 which would allow the user to visually monitor or inspect such changes over the desired period of time It will be appreciated that the pixel data may have originated from many sources, including images from engineering models, etc It will be appreciated that the hardware illustrated in FIG. 4 (or FIG. 5) may vary depending on the needs of given application Thus, the depicted example is not meant to imply structural limitations with respect to aspects of the present invention Accordingly, the foregoing configuration is shown by way of illustration and not by way of limitation. As such, other configurations may be implemented. For example, it is envisioned that the imaging device (e.g., camera) could be configured with appropriate modules to automatically form the cloud of pixel data with the temporally and spatially-registered pixels This could be performed in a camera integrating the means for determining positioning (e.g., GPS positioning or other positioning systems that may utilized in combination with GPS; or may be utilized as alternative options to GPS) in conjunction with ultrasonic or laser scanning modules for performing pixel space mapping This would allow the camera to determine geodetic coordinates and then projecting such coordinates onto local coordinates which would conveniently allow performing the pixel registration with a single device, e.g., the camera. One envisioned example implementation may involve an integration of a laser scanning module in the camera where each pixel in an image frame may be scanned (e g, sequentially parked on) by a laser beam from the laser scanning module, a processing module in the camera would then embed the appropriate coordinates (geodetic and/or local coordinates) and time stamp onto the pixel being presently parked on by the laser beam, then proceed to the next pixel till each pixel in the image frame is temporally and spatially-registered. It will be appreciated that the laser scanning operation for embedding the appropriate coordinates could be implemented with more than one scanning beam.

Figure 6:
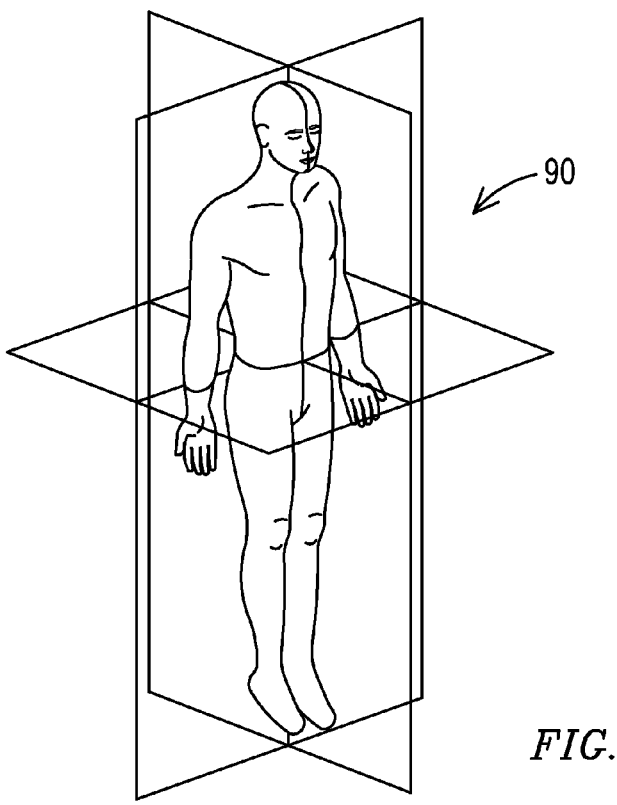
FIG. 6 is a schematic of an example coordinate system that may be used for assignment of pixel coordinates for forming spatially and temporally registered pixel data in the context of imaging an object such as an organ in a body of a human being.
Figure 5:
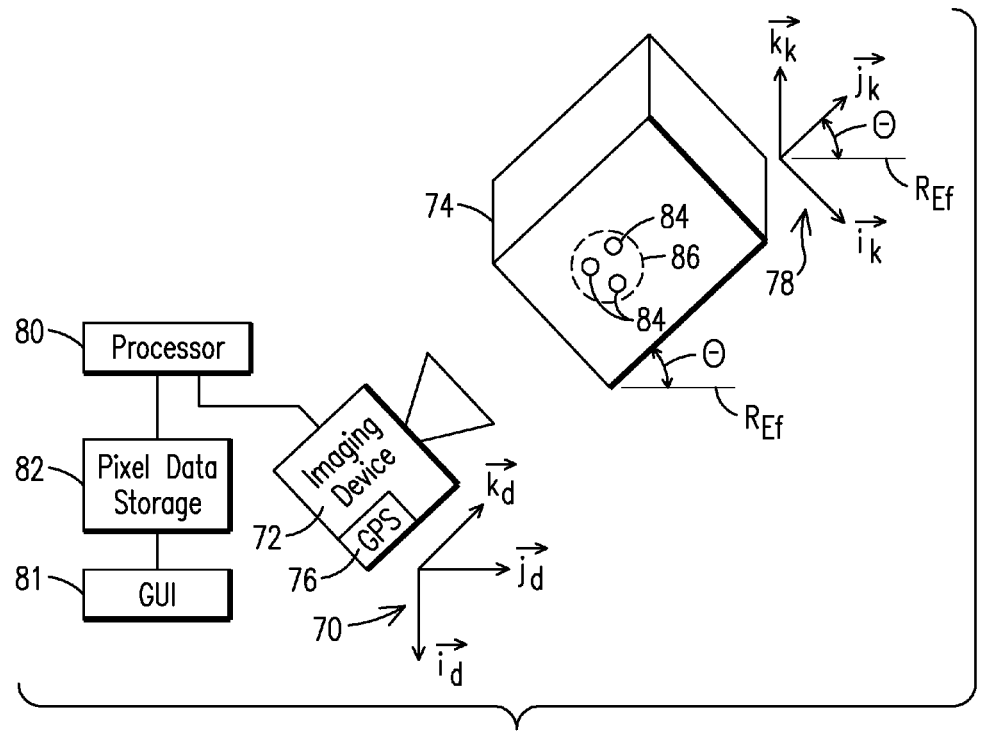

As may be conceptually appreciated in FIG. 5, in case the object 74 is a rotatable object or otherwise a movable object, the local coordinate system 78 may be configured to establish a reference frame which accounts for any such rotation (motion) so that the coordinate system behaves as an object-stable coordinate system. For example, in case of rotation of the object 74 by an angle θ relative to a predefined fixed reference (Ref), then local coordinate system 78 may also be referred to such fixed reference frame, which would allow vectorially relating the local coordinates of the rotating object with respect to such fixed reference Although the description above has been provided in the context of inspection of components in a turbine engine, it will be appreciated that aspects of the present invention are not limited to such applications For example, the foregoing concepts of transforming an image from an image-searchable domain to a pixel-searchable domain may be applied to the field of medical imaging In this application, the object may comprise at least a portion of an organ in a body of a subject, such as heart, brain, etc In this application, tag information may be indicative of biographical and demographical information of the subject, such as age, gender, social security number, etc., and/or may be indicative of appropriate physiological information in connection with the subject. In this application, an object-stable coordinate system 90, such as may be conceptualized in FIG. 6, may be associated with an individualized model of the subject and such coordinate system may be referenced to at least one anatomical feature of the subject, such as bone landmarks which can bear a constant spatial relation with respect to soft tissues Thus, in this case, the temporally and spatially-registered pixels would allow retrieving pixel data based on pixel coordinates associated with the individualized model of the subject This would allow medical personnel to efficiently retrieve pixel data from a cloud of pixel data conducive to monitoring changes that occur in an organ or region of interest of the subject independently of any image file naming convention that a given imaging service center may utilize. It will be appreciated that the number of fields that may benefit under this innovative paradigm are practically limitless For example, temporally and spatially-registered pixels stored in an appropriate cloud of pixel data would allow biologists or ecologists located practically anywhere in the world retrieving pixel data effective for monitoring temporal and/or spatial changes, such as may be indicative of ecological and biodiversity changes that may occur in land-based and/or marine-based habitats, such as may involve reefs, or a marine or coastal region of interest located anywhere in the world. This capability of retrieving visual information with any desired temporal and spatial selectivity is practically non-realizable in an image-searchable domain.

Certain aspects of the present invention may be embodied as systems and/or computer-implemented methods Furthermore, various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system. The computer program product aspects of the present invention may have computer usable or computer readable program code portions thereof, which are stored together or distributed, either spatially or temporally across one or more devices Computer program code for a processor to carry out operations of the method described above may be written in a high-level programming language, such as Java, C or C++, for development convenience, or other programming languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller A code in which a program of the present method is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile/video disc (DVD) The code can be configured for use in a computer or computing device which includes a memory, such as a central processing unit (CPU), a RAM and a ROM as well as a storage medium such as a hard disc The "step-by-step process" for performing the method herein is a specific algorithm, and may be shown as a mathematical formula, in the text of the specification as prose, and/or in a flow chart. The instructions of the software program create a special purpose machine adapted to carry out the particular algorithm Thus, in any means-plus-function claim, or functional claiming, herein in which the disclosed structure is a computer, or microprocessor, programmed to carry out an algorithm, the disclosed structure is not the general purpose computer, but rather the special purpose computer programmed to perform the disclosed algorithm A general purpose computer, or microprocessor, may be programmed to carry out the algorithm/steps of the present method creating a new machine The general purpose computer becomes a special purpose computer once it is programmed to perform particular functions pursuant to instructions from program software/code herein The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices While various embodiments have been shown and described herein, it will be apparent that such embodiments are provided by way of example only Numerous variations, changes and substitutions may be made without departing from aspects of the invention herein Accordingly, it is intended that the invention be limited only by the spirit and scope of the appended claims

The invention claimed is:

1. A computerized method comprising:
transforming an image depicting an object from an image-searchable domain to a pixel-searchable domain by way of spatial and temporal registration individually assigned to pixels forming the image;
storing pixel data comprising the spatial and temporal registration in an electronic storage;
retrieving pixel data from the electronic storage based on the individually assigned spatial and temporal registration; and
reconstituting an image with the retrieved pixel data,
wherein the transforming comprises:
extracting the pixels forming the image in the image-searchable domain;
individually assigning to each extracted pixel coordinates with respect to an object-stable coordinate system indicative of a location of a portion of the object depicted by said pixel in the image relative to the coordinate system; and
individually assigning to each extracted pixel a time-stamp indicative of a time when the image in the image-searchable domain is acquired,
wherein the transforming is performed to images acquired over a period of time of one or more objects to generate a plurality of temporally and spatially-registered pixels over the period of time and relatable to respective object-stable coordinate systems for the one or more objects,
wherein the one or more objects comprise at least a component of a combustion turbine engine respectively disposed at one or more power generation sites positioned at different geographical locations.

2. The method of claim 1, further comprising forming a cloud of pixel data with the temporally and spatially-registered pixels, and storing the cloud of pixel data in the electronic storage.

3. The method of claim 1, wherein the object-stable coordinate system is referenced to a geodetic coordinate system.

4. The method of claim 1, wherein the one or more respective objects further comprises at least a portion of a body of a human subject.

5. The method of claim 4, wherein the object-stable coordinate system is referenced to at least one anatomical feature of the subject.

6. The method of claim 2, further comprising retrieving from the electronically stored pixel data matching a queried spatial and temporal pixel registration, and reconstituting images from the retrieved pixel data effective for monitoring and/or evaluating changes in the one or more objects occurring over the period of time.

7. The method of claim 6, further comprising assigning to extracted pixels a tag comprising information regarding one or more parameters capable of influencing the object, and wherein the retrieving of pixel data from the electronic storage further comprises matching queried tag information regarding one or more parameters.

8. The method of claim 1, wherein the extracted pixels comprise respective groups of pixel components, and wherein each of said groups is assigned a respective spatial and temporal registration.

9. A computerized method comprising:
a) extracting pixels from an image depicting an object;
b) individually assigning to each extracted pixel coordinates with respect to an object-stable coordinate system indicative of a location of a portion of the object depicted by said pixel in the image relative to the coordinate system; and
c) individually assigning to each extracted pixel a time-stamp indicative of a time when the image is acquired,
wherein the one or more objects comprise at least a component of a combustion turbine engine respectively disposed at one or more power generation sites positioned at different geographical locations.

10. The method of claim 9, further comprising individually assigning to each extracted pixel a tag comprising information regarding one or more parameters influencing the object.

11. The method of claim 9, performing steps a) through c) in images acquired over a period of time of one or more objects to generate a plurality of temporally and spatially-registered pixels over the period of time and relatable to respective object-stable coordinate systems for the one or more objects.

12. The method of claim 11, further comprising forming a cloud of pixel data with the temporally and spatially-registered pixels, and storing the cloud of pixel data in an electronic storage.

13. The method of claim 12, further comprising retrieving from the electronic storage pixel data matching a queried spatial and temporal pixel registration, and reconstituting images from the retrieved pixel data effective for monitoring and/or evaluating changes in the one or more objects occurring over the period of time.

14. The method of claim 13, further comprising assigning to extracted pixels a tag comprising information regarding one or more parameters capable of influencing the object, and wherein the retrieving of pixel data from the electronic storage further comprises matching queried tag information regarding one or more parameters.

15. A computerized method comprising:

transforming an image depicting an object from an image-searchable domain to a pixel-searchable domain by way of spatial and temporal registration individually assigned to pixels forming the image;

storing pixel data comprising the spatial and temporal registration in an electronic storage;

retrieving pixel data from the electronic storage based on the individually assigned spatial and temporal registration; and reconstituting an image with the retrieved pixel data, wherein the one or more objects comprise at least a component of a combustion turbine engine respectively disposed at one or more power generation sites positioned at different geographical locations.

16. A computerized method comprising:

transforming an image depicting an object from an image-searchable domain to a pixel-searchable domain by way of spatial and temporal registration individually assigned to pixels forming the image;

storing pixel data comprising the spatial and temporal registration in an electronic storage;

retrieving pixel data from the electronic storage based on the individually assigned spatial and temporal registration; and reconstituting an image with the retrieved pixel data, wherein the one or more respective objects comprise at least a portion of a body of a human subject.

* * * * *